United States Patent [19]

Burgmann et al.

[11] 3,973,779
[45] Aug. 10, 1976

[54] SEALING ARRANGEMENT
[75] Inventors: Feodor Burgmann, Assenhausen; Klaus Safft, Wolfratshausen; Hans Forch, Birkenau; Gerd Upper, Gorxheimertal, all of Germany
[73] Assignees: Firma Feodor Burgmann Dichtungswerk, Wolfratshausen; Firma Carl Freudenberg, Weinheim, both of Germany; part interest to each
[22] Filed: June 13, 1974
[21] Appl. No.: 478,845

[30] Foreign Application Priority Data
June 22, 1973 Austria .................. 5520/73

[52] U.S. Cl. .................... 277/25; 277/65; 277/95; 277/134
[51] Int. Cl.[2] ............... F16J 15/16; F16J 15/54
[58] Field of Search ................ 277/65, 25, 134, 95

[56] References Cited
UNITED STATES PATENTS

| | | | |
|---|---|---|---|
| 2,637,574 | 5/1953 | Diehl | 277/25 |
| 2,781,209 | 2/1957 | Jacobs | 277/25 UX |
| 2,936,715 | 5/1960 | Southam et al. | 277/25 X |
| 3,252,298 | 5/1966 | Andrews | 277/25 X |
| 3,561,770 | 2/1971 | Corsi | 277/25 UX |
| 3,627,390 | 12/1971 | Irwin | 277/25 |
| 3,703,296 | 11/1972 | Malmstrom | 277/95 |
| 3,843,140 | 10/1974 | Mayer | 277/134 |

FOREIGN PATENTS OR APPLICATIONS
139,521  7/1961  U.S.S.R. ........................ 277/134

Primary Examiner—Samuel B. Rothberg
Attorney, Agent, or Firm—Jerry Cohen; Charles Hieken

[57] ABSTRACT

A resilient shaft sealing lip is biassed to bear against a shaft when the shaft is at rest to prevent egress of lubricating liquid past the sealing lip, but upon rotation of the shaft at its rated speed the lip lifts so that sealing friction forces are limited to those generated by liquid friction and a return conveyor mechanism provided in combination with the lip, is effective upon shaft rotation to return escaping liquid and thereby take the place of a tight sealing lip for this purpose. The arrangement thereby provides reduced wear, reduced heat generation and reliable prevention of leakage with long service life consistent with economical and modular construction.

28 Claims, 5 Drawing Figures

SEALING ARRANGEMENT

BACKGROUND OF THE INVENTION

The invention relates to a seal arrangement for the sealing of a shaft, guided through the bore of a housing wall, against the egress of a liquid medium when the shaft turns in a given direction or when it is at rest.

The prior art includes seals which have one or more annular sealing lips made of elastic material, especially rubber, which are pressed against the shaft by an edge prestressed radially inward by spring force. In simple applications, the radially inwardly directed force can be produced by the elastic property of the sealing lip itself or by an endless spiral spring surrounding the sealing lip. Seals of this type have the benfit of a low manufacturing cost and space requirement and therefore are utilized widely in practice. But their utilization is restricted, on one hand, by the temperature that occurs at the sealing lip as a result of the elevated temperature of the sealing lip due to frictional heat, and, on the other hand, by the wearing and/or a lifting off of the sealing lip when the shaft undergoes large dynamic motions.

A low contact force of the sealing lip is sufficient to seal the shaft reliably when it is at rest. If the same sure sealing action is to be achieved for rotating shafts also, then the contact force must be raised substantially in order to prevent the sealing edge from lifting and a leak flow developing due to an eccentricity or vibrations of the shaft. Accordingly, at high peripheral speeds, a considerable development of heat occurs at the sealing edge which presses practically linearly on the shaft. If the temperature of the liquid medium to be sealed or of the shaft is relatively high, then, depending on the maximum thermal load capacity of the elastic material of the sealing lip, the limit of utilizability of the seal is soon reached. The lip seal is sensitive to even the smallest damages, e.g. scratches, of the contact surface of the shaft interacting with it. This effect occurs when the shaft is rotating, but practically not at all when it is at rest.

Other known seals have an annular member, arranged in the housing bore to be sealed off, which with its cylindrical inner surface surrounds the shaft with a slight radial clearance. Hollowed out in the inner surface are thread-shaped grooves whose thread direction chosen in the sense of a return of the escaping liquid medium into the space to be sealed off. For such types of seals, there is no restriction for the range of high peripheral speeds. But since the return action decreases as the rotational speed of the shaft falls and becomes equal to zero when it is at rest, it is necessary to form the grooves with a small cross-sectional area and to select a square-threaded variation in order that the leak flow remain small under the indicated operating conditions. But, due to these restrictions, it is not possible to form the grooves for an optimal return action and thereby make them suitable for the sealing of a liquid medium which under certain circumstances may even be under pressure.

The return action during rotation and also the limitation of the leakage while at rest presupposes the maintenance of a minimum radial clearance between the shaft and the stationary annular member. Accordingly, the utilization of such known seals is limited to exactly concentrically running shafts with exact machining of the shaft's surface. But these conditions can not always be respected in practice, e.g. for crankshaft seals, particularly because of bearing wear.

An important object of the invention is to create a seal arrangement which reliably suppresses a leak flow when a shaft is rotating or at rest and whose utilization limits with respect to the shaft's rotational speed and particularly with respect to the shaft's peripheral speed are raised and which places low requirements on the concentric running of the shaft.

According to the invention, this problem is solved by the combination of an annular sealing lip made of elastic material which is fastened in a sealing manner to the wall or the shaft and which with its sealing edge is pressed by spring force against an annular surface, in fixed relation to the shaft or the wall, respectively, and coaxial with the shaft, with a force that with consideration to the aforesaid installation and operating conditions reliably prevents a leak flow when the shaft is at rest but that, at least in the heated state of the sealing lip to be anticipated under normal operating conditions, permits a leak flow at full rotational speed of the shaft, together with a return mechanism, connected in series with said sealing lip with respect to the leak flow, consisting of a hollow body which is supported on the wall in a nonrotatable sealing manner and displaceable in the radial direction against spring action and which is made of a material having good antifriction properties, such as polytetrafluorethylene, graphite, metallic powder, impregnated asbestos or a mixture of such materials, and which with its cylindrical bore surrounds, with slight radial clearance or under sliding contact, a longitudinal section of the shaft or a sleeve fastened to the latter in a sealing manner, with thread-shaped return grooves being cut in the bore of the hollow body or in the longitudinal section of the shaft or the sleeve surrounded by the latter hollow body.

By means of the above described construction of the seal arrangement, the return mechanism, and particularly the construction of the thread-shaped grooves, can be designed for an optimal return effect with a rotating shaft because a leak flow with a resting shaft is hindered by the sealing lip which, for its part, need exert no sealing action when the shaft is turning and therefore can make do with a substantially lower contact force than would have to be provided according to the usual dimensioning rules. The hollow member having the return grooves can be adapted to extensions of the shaft so that, when determining the size of the radial clearance between its bore and the shaft surface surrounded thereby, only production tolerances need be considered, but not the accuracy of the shaft bearing or the magnification of the bearing play during operation. The possible reduction of the radial clearance of the return mechanism leads to an improved return effect.

According to the invention, for the reliable prevention of a leak flow with a stationary shaft the sharp sealing edge of the cold sealing lip should be applied to the associated annular surface with a contact force of at least 50 grams per centimeter of edge-circumference length, with materials ordinarily utilized for lip seals and at least 25 grams per centimeter of edge circumference length for extremely soft materials, with the mentioned values being valid without influence by a possible present centrifugal force. On the other hand, this contact force relative to the cold state should be less than 150 grams per centimeter of edge-circumference length, for extremely soft materials 75 grams per centimeter of edge-circumference length in order that a leak flow can occur under normal operating conditions of the shaft. If the sealing lip is integral with the shaft and during rotation is subjected to the action of the centrifugal force in the direction of a reduction of the originally present contact force, then a pressureless application of the sealing lip to the annular surface integral with the wall or a lifting of said annular surface can be achieved, with any wear of the sealing edge during operation being eliminated.

It is essential for the determination of the magnitude of the contact force that a reliable sealing should be achieved by the sealing lip when the shaft is at rest, allowing for all operating circumstances, whereas a leak flow should occur at full rotational speed of the shaft. It can thereby be achieved that the sealing lip is operated not in the usually present state of mixed friction, but rather of liquid friction. In conjunction with the lower contact force and improved lubrication, the frictional wear and frictional heat and therewith the temperature rise of the sealing edge relative to the temperature of the medium to be sealed can thus be sharply reduced. Considering the fact that under ordinary operating temperatures of 120°C to 130°C, such as are observable in crankshaft seals of internal combustion engines, a drop of 10°C in the temperature at the sealing edge already increases the service life of the sealing lip by 30–50%, there results a substantially longer service life of the sealing lip. But with the seal arrangement according to the invention, a sealing lip dimensioned with such a low contact force can also be utilized for shaft peripheral speeds that heretofore were ruled out for known sealing lips.

According to another feature of the invention, the sealing lip forms a ready-to-install unit together with the return mechanism. This unit preferably also contains a dust guard which is provided on the suction side of the return mechanism and axially before the hollow body which forms an essential component thereof and which surrounds the shaft annularly, with the dust guard being pressed against the shaft with minimal pressure or being adjusted to it with slight radial clearance. The dust guard prevents dust particles or small particles from being sucked in by the suction action of the return mechanism, reaching the sealing edge and damaging the latter by wear. The dust guard consists preferably of an air-permeable easily deformable filter material, particularly a nonwoven fabric made of synthetic and/or natural fibers.

Other objects, features and advantages of the invention are given in the following detailed description of preferred embodiments, taken in connection with the accompanying drawing in which:

DETAILED DESCRIPTION OF PREFERRED EMBODIMENTS

All seal arrangements according to the invention, embodiments of which are described hereinafter, are utilized to seal a shaft 3 guided concentrically through the bore 1 of a wall 2 in order to prevent the overflow of a liquid medium from a space 4, which is to be sealed and which is formed, for example, by the interior of a crankshaft housing of an internal combustion engine, into a space 5. Structural members that essentially correspond to each other in their method of operation and/or in their construction are denoted by the same numbers and a following letter for the different embodiments.

Figure 1:
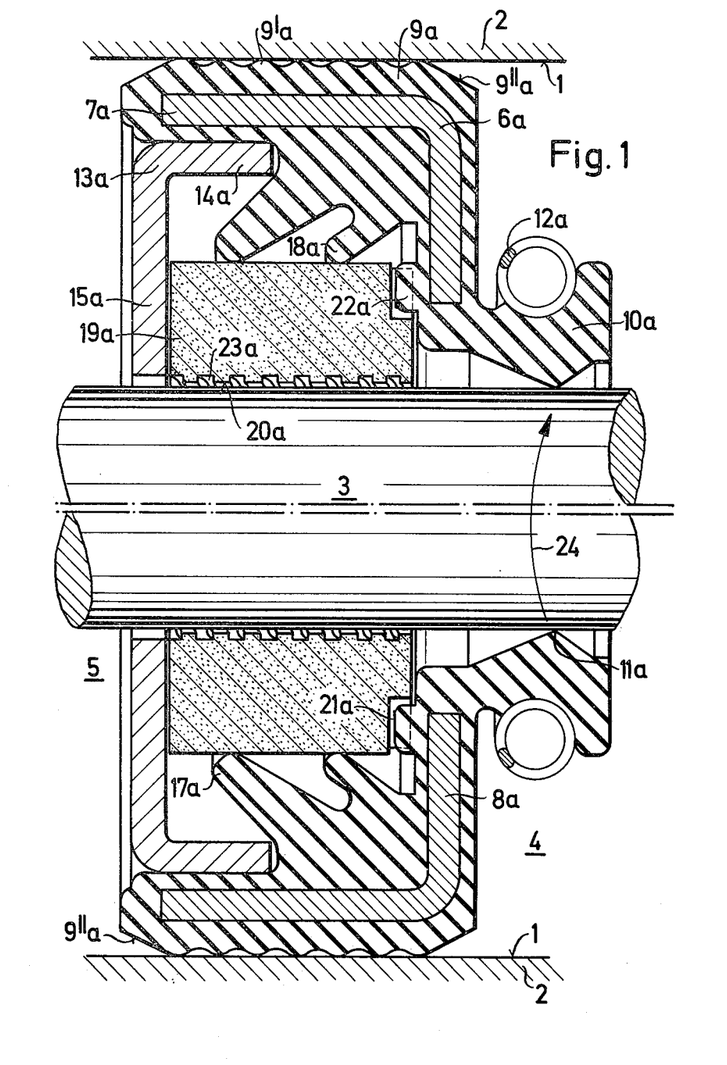
FIG. 1 is an axial section through a first embodiment with stationary sealing lip and two-piece construction of the seal housing.

The seal arrangement according to FIG. 1 has an outer socket-shaped housing shell 6a which is made of a dimensionally stable material and which consists of a hollow cylindrical part 7a coaxial with the shaft 3 and of an annular part 8a which is connected integrally to the cylindrical part on the side facing toward the space 4 and which projects radially inward toward the shaft. The housing shell 6a has a full sheath 9a made of elastic material, e.g. rubber, whose outer periphery in the central region of its axial length has projecting ripples 9'a, coaxial with the shaft 3, which press against the bore 1 and which merge at both ends with tapered surfaces 9"a that serve to facilitate insertion of the seal arrangement into the bore 1.

In the region of the radially inside bore of the annular part 8a, the sheath 9a is continued into an annular sealing lip 10a which is essentially coaxial with the shaft and which projects in the direction of the space 4. On its inner peripheral surface facing toward the shaft 3, the sealing lip is formed with a sharp sealing edge 11a. Approximately in the radial plane of the sealing edge 11a, the sealing lip 10a has a semicircular recess which is formed on its outer periphery and which holds a spiral spring 12a connected to form a ring.

The spiral spring 12a presses the sealing lip 10a radially inward and ensures that the sealing edge 11a presses against the shaft 3. Taking into consideration a possible intrinsic spring prestress exerted by the sealing lip 10a, the spiral spring is so dimensioned that when the shaft 3 is at rest the liquid medium situated in the space 4 cannot pass between the sealing edge 11a and the shaft 3 into the space 5. On the other hand, likewise taking into consideration a possible intrinsic prestress of the sealing lip 10a, the contact force exerted by the spiral spring should, at least in the warm state, not attain such a value that a sealing results when the shaft 3 is rotating. A leak flow, even though slight, should thus be able to develop during rotation, so that the sealing edge 11a goes over from the usual state of mixed friction to that of liquid friction and, consequently, the frictional force and thus also the frictional heat remain considerably below the usual values.

Inside the part 7a of the socket-shaped housing shell 6a covered by the sheath 9a, another inner housing shell 13a made of dimensionally stable material with its hollow cylindrical part 14a is pushed in and secured by force fit. At its end facing toward the space 5, the inner housing shell is continued radially inward with an integrally molded annular part 15a. Two annular lips 17a, 18a are integrally molded to the longitudinal section of the sheath 9a which lines the inner wall of the annular part 7a and which is not covered by the hollow cylindrical part 14a. Starting from their base ends, which lie adjacent to the inside corner formed by the annular part 8a with the hollow cylindrical part 7a and in the middle of the hollow cylindrical part 14a, the annular lips extend inward at an angle relative to the axis of the shaft 3 and in the direction toward the space 5, with the annular lip 17a engaging inwardly under the hollow cylindrical part 14a.

Supported in the annular space delimited by the housing shell 13a, the annular lips 17a, 18a, the sheath 9a covering the inside of the annular part 8a and the shaft 3 is a hollow cylindrical body 19a whose bore 20a surrounds the shaft 3 with minimal radial clearance or is in contact with the shaft. The hollow body 19a consists of a slip-promoting, moldable material, e.g. polytetrafluorethylene, graphite, metal powder, impregnated asbestos or a mixture of such materials. On the end face of the hollow body 19a facing toward the space 4 there are hollowed out two pocket-shaped depressions 21a, displaced by 180°, into which engage approximately complementarily shaped projections 22a with clearance all around, said projections being integral with the sheath 9a. The hollow body 19a is held in a concentric position by the annular lips 17a, 18a pressing sealingly against it, but can follow a radial out-of-roundness of the shaft 3 by elastic deformation of these lips. In any event, rotation is prevented by the projections 22a engaging into the pocket-shaped depressions 21a.

Thread-shaped return grooves 23a are machined into the bore 20a of the hollow body 19a, with the thread hand being the same as the direction of rotation of the shaft when the latter is viewed from the space 5. Thus, the grooves have the shape of a left-handed thread in the direction of rotation designated by the arrow 24 (counterclockwise). In any event, the hand of the thread should be so chosen that the liquid medium emerging from a space 4 to be sealed is conveyed back into the aforesaid space when the shaft 3 rotates in the stipulated direction of rotation. With respect to an axial section, the grooves 23a have a rectangular or slightly trapezoidal cross-section, with the groove depth being less than the groove width and the latter in turn being approximately equal to half the groove spacing. Preferably, a multiple thread with the following size ratios is utilized:

| | | |
|---|---|---|
| groove depth / groove width | = approximately | 0.1 – 0.25 |
| groove spacing / groove width | = | 1.4 – 2.5 |
| pitch angle α | = | 11 – 24° |

For a specific embodiment there result:

| | | |
|---|---|---|
| groove depth | = | 0.3 mm |
| groove width | = | 1.2 mm |
| spacing | = | 2.0 mm |
| pitch angle α | = | 14°30' |
| shaft-bore radial clearance | = | 0.05 – 0.1 mm |

The contact force with which the sealing lip 10a with its sharp edge 11a presses against the shaft is less than 150 grams per centimeter of peripheral length in the cold state for materials ordinarily utilized for lip seals (on the basis of NBR-, ACM- and FKM rubber with a shore hardness of approximately 75 to 80 shore A), but more than 50 grams per centimeter of peripheral length. If extremely soft materials are utilized in special cases (on the basis of ACM- and FKM rubber with a shore hardness of 60 to 70 shore A), then these values are reduced to less than 75 and more than 25 grams per centimeter of peripheral length. In the warm state (operating state), the contact force is diminished and, indeed, the temperature dependence becomes greater the more the intrinsic stress of the sealing lip 10a contributes to the generation of the contact force in comparison to the spiral spring 12a.

Figure 2:
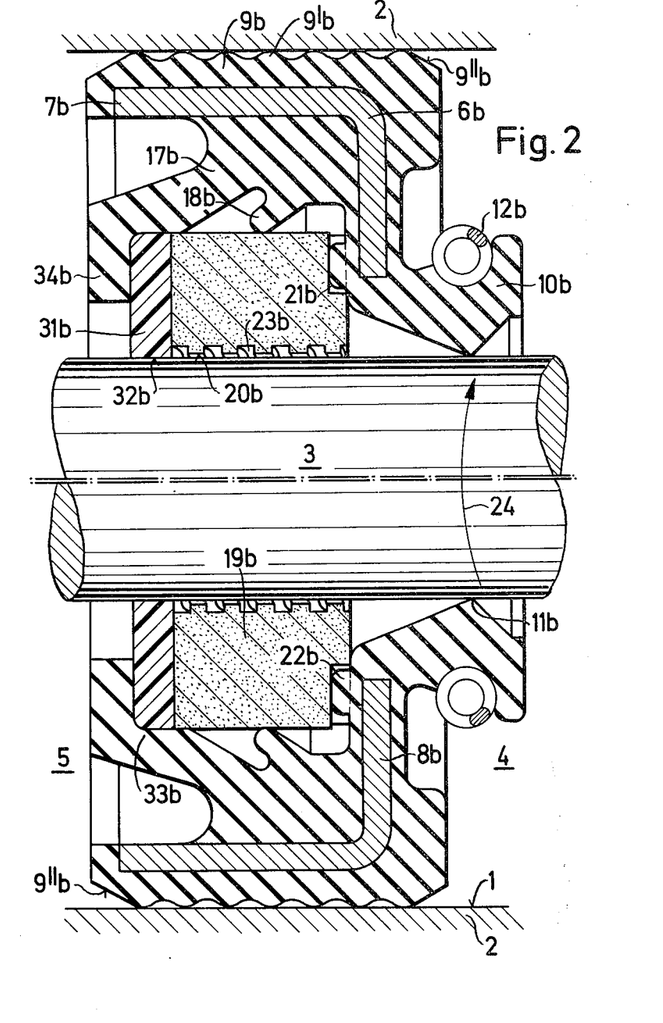
FIG. 2 is a section, corresponding to FIG. 1, of a second embodiment with stationary sealing lip, one-piece seal housing and a dust guard mounted before the return mechanism.

In the embodiment according to FIG. 2, a ring 31b made of nonwoven fabric is inserted before the hollow body 19b having the return grooves 23b, on the suction side of said grooves, i.e. on the side facing toward the space 5, said ring pressing with its bore 32b against the shaft 3 without pressure or with only minimal pressure. The annular lip 17b pressing against the body 19b is prolonged in the direction of the space 5 by a tubular extension 33b which surrounds the outer periphery of the nonwoven fabric ring 31b and which is continued radially inward by an annular section 34b. The latter presses the nonwoven fabric ring 31b against the body 19b in the axial direction with such a light pressure that its radial displaceability is not impaired.

The nonwoven fabric ring 31b prevents dust particles or other particles from being sucked from the space 5 through the return grooves 23b and being carried to the edge 11b of the sealing lip 10b and causing wear phenomena at said edge. Even if the nonwoven fabric ring surrounds the shaft 3 in a tight-fitting manner when initially installed, due to the easy deformability of the material there occurs after a short period of operation an automatic fitting in the sense of a merely light pressing and the negligibly small frictional heat resulting therefrom. On the other hand, the protective function of the nonwoven fabric ring 31b is also permanently maintained, since it is connected to the hollow body 19b in a form-locking manner by the tubular extension 33b of the annular lip 17b and in a force-locking manner by the pressure against the end face, said hollow body holding it in a coaxial position relative to the shaft 3 and thus preventing an unallowable extension of its bore 32b.

Figure 3:
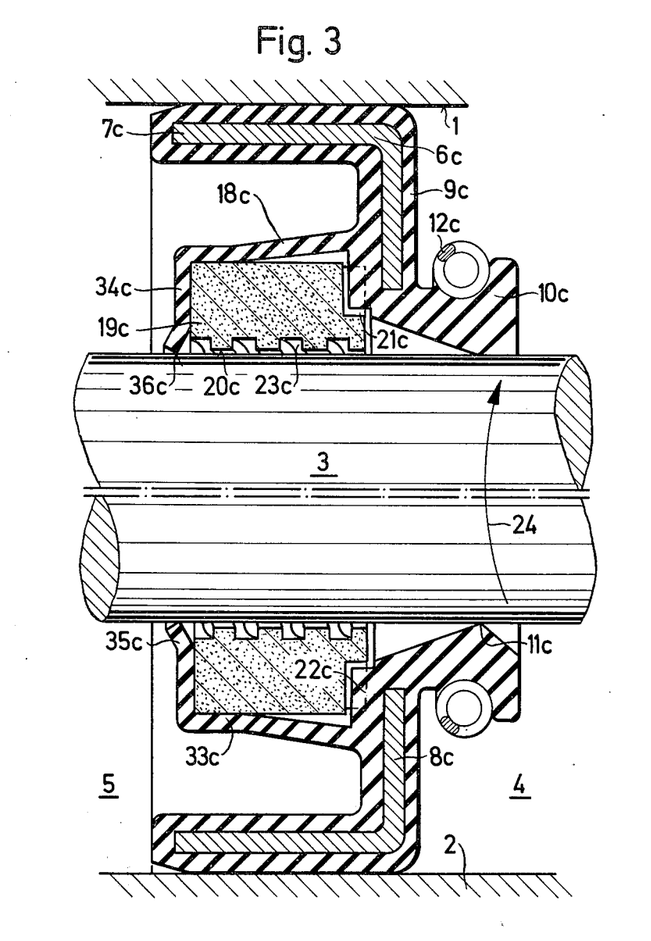
FIG. 3 is a section, corresponding to FIG. 1, of a third embodiment with stationary sealing lip, return mechanism mounted into a one-piece seal housing and a dust guard mounted before the seal housing.

In the embodiment according to FIG. 3 there is a single annular lip 18c which is molded to the integral sheath 9c covering the inside of the annular part 8c of the housing shell 6c. Said annular lip 18c, constructed in the shape of a conic-frustumtype tube and surrounding the hollow body 19c with radial clearance, is prolonged by a cylindrical tube-like extension 33c which presses tightly and in a sealing manner against the outer periphery of the hollow body in a region that borders on the end face of said hollow body facing toward the space 5. At the aforesaid end face, the tubular extension is continued by a radially inwardly facing annular section 34c. The latter has a frusto-conical-shaped lip 35c which presses against the shaft 3 with minimal pressure with an edge 36c or approaches the shaft while leaving a small gap and thereby prevents the entry of dust or particles.

The annular section 35c holds fast the hollow body by means of its elastic intrinsic stress and also secures the latter against an axial displacement, so that a clearance remains between the end face of the hollow body 19c facing toward the space 4 and the sheath 9c. Another guard against rotation is provided by projections 22c of the sheath 9c which engage with clearance into pocket-shaped depressions 21c of the hollow body 19c, but do not hinder its radial mobility.

Figure 4:
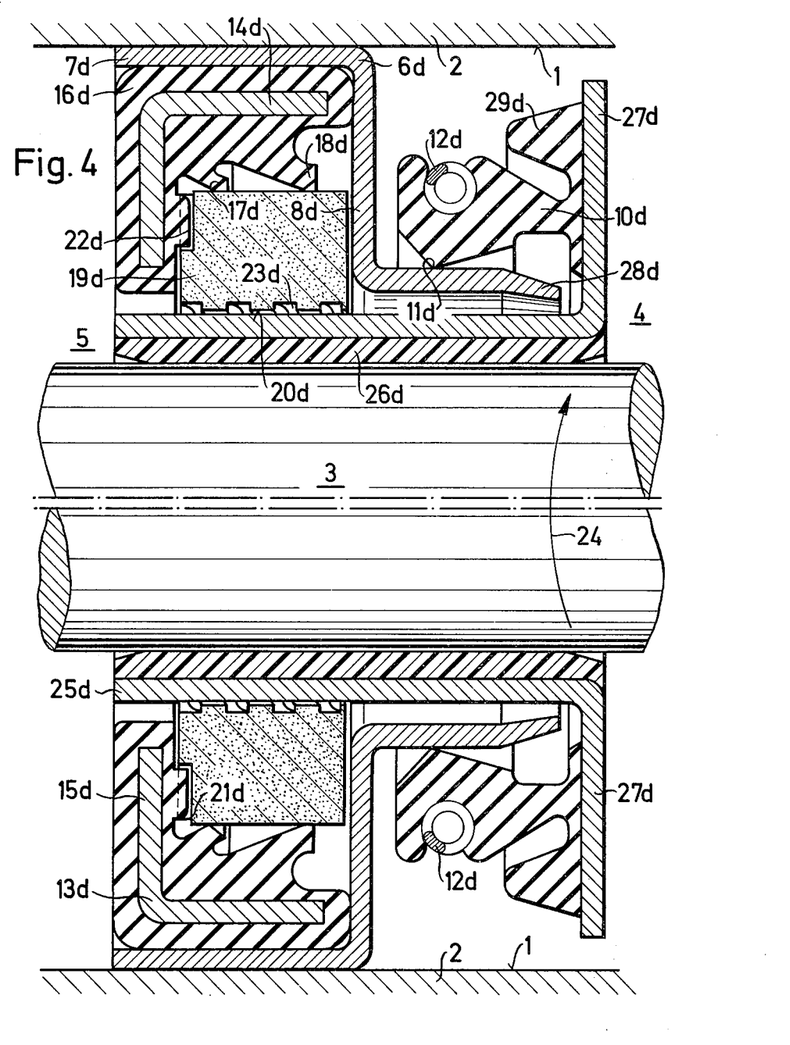
FIG. 4 is a section, corresponding to FIG. 1, of a fourth embodiment with rotating sealing lip pressing against a cylindrical part of the seal housing.

The embodiment according to FIG. 4 differs from the preceding one in that the sealing lip rotates together with the shaft.

This seal arrangement contains a shaft sleeve 25d which with an elastic lining 26d integral with its bore is fastened by force fit to the shaft 3 rotating counterclockwise in the direction of the arrow 24. Molded to the shaft sleeve 25d at the end facing toward the space 4 is a radially outwardly projecting flange 27d to which the sealing lip 10d is fastened. The latter extends from the side of the flange facing toward the space 5, concentric with the shaft and at a radial distance from it, in the dirction toward the aforesaid space. The annular part 8d of the socket-shaped housing shell 6d is prolonged by an integrally connected additional hollow cylindrical part 28d of smaller diameter in the direction toward the space 4, without contacting the shaft sleeve 25d or its flange 27d.

The outer periphery of this additional hollow cylindrical part 28d forms the sliding surface for the sealing lip 10d pressing against it with the edge 11d. At the outer periphery the sealing lip 10d has a peripheral groove which holds the spiral spring 12d by more than half of its circumference, relative to an axial section. It is thereby brought about that the spiral spring is not detached from the sealing lip under the action of centrifugal force, but rather favors its lifting from the sliding surface when the shaft rotates. For this purpose, the spiral spring can also be constructed with increased mass or additional masses can be attached to the spiral spring or directly to the sealing lip. An annular bulge 29d surrounds the sealing lip 10d, integral with it, with radial clearance so that its deflection under the action of centrifugal force is limited and a protection against external mechanical damage is secured.

In contrast to the embodiment according to FIG. 1, the outer housing shell 6d has no sheath, while the annular lips 17d, 18d, and the projections 22d engaging into the pocket-shaped depressions 21d of the hollow body 19d are molded to a cover 16d which completely covers the inner housing shell 13d.

Figure 5:
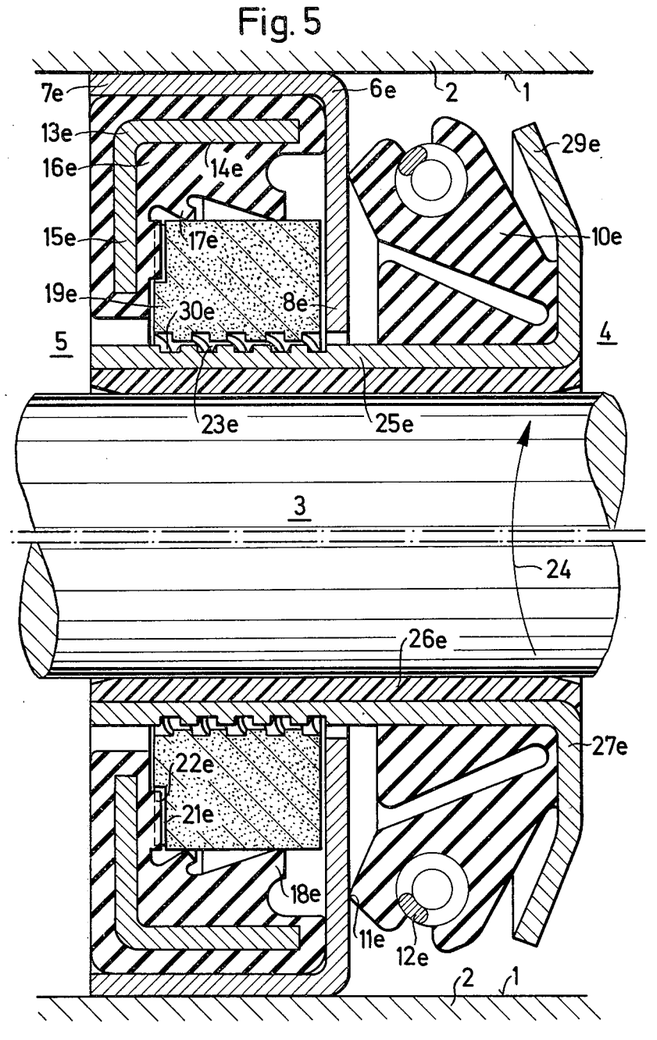
FIG. 5 is a section, corresponding to FIG. 1, of a fifth embodiment with rotating sealing lip pressing against a surface of the seal housing, said surface lying in a radial plane.

In the embodiment according to FIG. 5, the sealing lip 10e is constructed so as to rotate and starts out from the flange 27e of the shaft sleeve 25e as in FIG. 4, but extends obliquely outward relative to an axial section and with its sealing edge 11e contacts the exposed outer surface of the annular part 8e of the housing shell 6e. With this design, radial displacements of the shaft of considerable magnitude can be allowed while maintaining a reliable sealing action.

The flange 27e of the shaft sleeve 25e has a conic-frustumshaped extension 29e which prevents an excessive deflection of the sealing lip 10e and protects the latter from external mechanical damage.

Thread-shaped return grooves 30e are worked into the axial peripheral region of the shaft sleeve 25e surrounded by the hollow body 19e. These grooves essentially correspond in their construction to the return grooves 23e of the body 19e (in this regard, note the data given for the embodiment of FIG. 1), but have an opposite hand of rotation (thread direction). By the utilization of oppositely directed return grooves in the rotating and stationary parts of the seal, the return action can be increased up to eight times relative to that with conveying grooves only in the stationary part or only in the rotating part.

The conveyance resistance with the pumping work of the return grooves is higher in the arrangement according to FIG. 1 than in the reversed (in the sense of the leak flow direction) arrangement of the actual sealing elements 19 and 10. Therefore, under certain conditions (e.g. high incidence of oil), the arrangement of these sealing elements in the sequence oil space 4 - hollow body 19 with return grooves - sealing lip 11 - outer space 5 can become necessary.

In such a design, the oil space 4 would then have to be exchanged with the outer space 5 in the diagrammatic illustration of FIGS. 1–5 and the direction of rotation of the shaft 3 would have to be indicated opposite to the arrow 24 or reversed thread hand of the return groove or grooves 23, 30 would have to be provided. Measures to prevent the entry of dust or small particles can then be eliminated.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

We claim:

1. Shaft seal assembly comprising an elastic annular seal, biassing means which hold the seal in sealing engagement but allow the seal to break away at a preselected increase of shaft speeds to allow leakage along a leakage path downstream of the seal and a fluid conveyor located in said leakage path to contact escaping fluid to be sealed ahead of the elastic annular seal,
    a. a hollow member which is supported on the wall in a nonrotationable sealing manner and displaceable in the radial direction against spring action and which is made of a material having good antifriction properties, such as polytetrafluorethylene, graphite, metallic powder, impregnated asbestos or a mixture of such materials, and with its cylindrical bore surrounds, with slight radial clearance or under sliding contact, a longitudinal section of the shaft or a sleeve fastened to the latter in a sealing manner,
    b. with tread-shaped return grooves being cut in the bore of the hollow member and/or in the longitudinal section of the shaft or the sleeve surrounded by the latter hollow member,
    c. means defining thread form grooves cut in the bore of the hollow member and/or in the longitudinal section of the shaft or the sleeve surrounded by the latter hollow member to define said conveyor and being constructed and arranged to return escaping liquid to said housing.

2. Seal arrangement according to claim 1 wherein the sealing lip forms a ready-to-install unit together with the return mechanism.

3. Seal arrangement according to claim 2 wherein a dust guard which surrounds the shaft annularly and presses against it with minimal pressure is provided on the suction side of the return mechanism and axially before the hollow body, said dust guard forming a ready-to-install unit together with the sealing lip and the return mechanism.

4. Seal arrangemnt according to claim 3 wherein the sharp sealing edge of the sealing lip, when in the cold state and not influenced by a possible centrifugal force, presses against the associated annular surface with a contact force of at least 50 grams per centimeter of edge-periphery length for materials ordinarily utilized for sealing lips and at least 25 grams per centermeter of edge-periphery length for extremely soft materials.

5. Seal arrangement according to claim 4 wherein the sharp sealing edge of the sealing lip made of ordinary material and in the cold state presses against the associated annular surface with a contact force of less than 150 grams per centimeter of edge-periphery length.

6. Seal arrangement according to claim 4 wherein the sharp sealing edge of the sealing lip made of extremely soft material and in the cold state presses against the associated annular surface with a contact force of less than 75 grams per centimeter of edge-periphery length.

7. Seal arrangement according to claim 4 wherein, at least when the specified nominal rotational speed of the shaft is reached, the sealing lip rotating with the shaft presses without force against the annular surface in fixed relation to the wall.

8. Seal arrangement according to claim 4 wherein the hollow body surrounding the shaft is supported in a radially displaceable manner and sealed in a seal housing made of dimensionally stable material by at least one annular lip made of elastic material and wherein the hollow body is secured against rotation by these annular lips and/or by an additiional mechanism engaging in a form-locking manner.

9. Seal arrangement according to claim 8 wherein the seal housing contains an outer socket-shaped housing shell which has a hollow cylindrical part, which part is insertable into the bore of the wall by force fit directly or with interposition of an elastic sheath, said part surrounding the hollow body and the annular lips supporting the latter and being continued integrally at one end into a radially inwardly projecting annular part which engages over at least a portion of an axial end face of the hollow body.

10. Seal arrangement according to claim 9 wherein the seal housing contains an inner housing shell which has a hollow cylindrical part, which part is insertable by force fit into the hollow cylindrical part of the outer housing shell, said part bing continued integrally at one end into a radially inwardly projecting annular part which engages over at least a portion of the other axial end face of the hollow body.

11. Seal arrangement according to claim 10 wherein the hollow body is supported and sealed by two annular lips which are constructed integrally with an elastic sheath at least partially covering the inner face of the outer housing shell, said lips being directed obliquely inward and away from the annular part of the outer housing shell and pressing against the outer periphery of the hollow body each on a different side of its transverse center plane.

12. Seal arrangement according to claim 9 wherein the hollow body is supported and sealed by an annular lip which is molded to an elastic sheath covering the inner face of the annular part of the outer housing shell, starting therefrom surrounds the hollow body with radial clearance and is pressed with a tubular extension against the outer periphery of the hollow body adjacent to its end being distant from the annular part.

13. Seal arrangement according to claim 12 wherein the annular lip, pressing against the end of the hollow body being distant from the annular part, or its tubular extension, has a radially inwardly projecting annular section which engages behind at least the radially outlying region of the axial end face of the hollow body facing away from the annular part.

14. Seal arrangement according to claim 13 wherein the annular section has a lip serving as a dust guard which presses against the shaft with minimal pressure or approaches the shaft while leaving a small gap.

15. Seal arrangement according to claim 10 wherein the hollow body is supported and sealed by two annular lips which are constructed integrally with a cover at least partially covering the inner face of the inner housing shell, said lips being directed obliquely inward and away from the annular part of the inner housing shell and pressing against the outer periphery of the hollow body each on a different side of its transverse center plane.

16. Seal arrangement according to claim 9 wherein the sealing lip is fastened to the annular part of the outer housing shell in the region of its bore surrounding the shaft with clearance, wherein the sealing lip projects therefrom outwardly in the form of a collar surrounding the shaft and presses against the shaft with a edge, and wherein a recess running around the outer periphery of the sealing lip approximately in the radial plane of the edge holds an endless spiral spring which prestresses the sealing lip radially inward to generate the contact force.

17. Seal arrangement according to claim 1 wherein it has a shaft sleeve which is fastened to the shaft directly or via an elastic lining, which surrounds the bore of the hollow body over a section of its axial length, which is prolonged by a section connecting thereto and which has a radially outwardly projecting flange at its free end, and wherein the sealing lip is fastened to said flange on the side facing toward the body.

18. Seal arrangement according to claim 17 wherein the sealing lip presses with the edge projecting from its inner periphery against the outer periphery of a hollow cylindrical part which projects outwardly from the annular part of the outer housing shell.

19. Seal arrangement according to claim 17 wherein the sealing lip, starting from its point of attachment to the flange, extends conically to an outer surface of the outer housing shell lying in a radial plane and presses against the latter with its edge.

20. Seal arrangement according to claim 17 wherein the endless spiral spring generating the contact force of the sealing lip is arranged in a recess running around the outer periphery of the sealing lip, said recess surrounding the spiral spring with more than half its circumference relative to a cross-section taken along the axis of the shaft.

21. Seal arrangement according to claim 7 wherein the sealing lip rotating together with the shaft is constructed with such an intrinsic mass or has such additional masses fastened thereto that, before reaching the nominal rotational speed of the shaft, the sealing edge of the sealing lip contacts it contrarotating surface not at all or only without pressure.

22. Seal arrangement according to claim 3 wherein the dust guard is made of air-permeable easily deformable filter material.

23. Seal arrangement according to claim 22 wherein the dust guard is made of a nonwoven fabric made of synthetic and/or natural fibers.

24. Sealing arrangement for a shaft which passes through an opening of a wall of a liquid containing housing comprising,
   a. means defining an elastic annular seal surrounding the shaft and coaxially arranged with respect thereto for sealing in said liquid when the shaft is stationary by contact of two elements of said seal,
   b. means for lightly biassing said sealing element to effect said sealing in when the shaft is stationary but responsive to conditions of shaft rotation to break away said contact so that liquid runs between said elements,
   c. means defining a conveyor of elongated length arranged spirally around said shaft for conveying escaping liquid back into the housing,
      the operation of said conveyor being directly responsive to shaft rotation,
      and wherein said conveyor defining means comprises a block of low friction material surrounding the shaft with a bore closely spaced with respect to said shaft,
      means for holding the block in a concentric relation to said shaft but allowing small radial displacement to follow radial displacement of the shaft within said opening,
      at least one of the exterior surfaces of the shaft and the interior surface of the bore having a spiral groove therein defining the said elongated conveyor and being pitched so that liquid is conveyed back to the housing when the shaft rotates in its stipulated direction of rotation.
      the block being ahead of said elastic annular seal in relation to escaping fluid to be sealed.

25. Sealing arrangement in accordance with claim 24 wherein the contact elements of the seal include a surface of revolution which extends radially with respect to the shaft axis.

26. Sealing arrangement in accordance with claim 24 wherein said means for holding the block comprise an annular reinforced, resilient housing member mounted to said wall and secured against rotation and comprising at least one frusto-conic resilient leg arranged around the outside of the block to yieldingly oppose radial movement of the block and to house said block in a manner securing it against rotation.

27. Sealing arrangement in accordance with claim 26 wherein said housing member is frictionally engageable in said wall opening.

28. Sealing arrangement in accordance with claim 27 wherein said housing member has an outer annular surface which is rippled.

* * * * *